Jan. 28, 1930.                    H. R. PORTER                    1,745,189
                              ANGLE OR CROSS VALVE
                              Filed April 7, 1928

INVENTOR
Harper R. Porter
BY
ATTORNEY.

Patented Jan. 28, 1930

1,745,189

UNITED STATES PATENT OFFICE

HARPER R. PORTER, OF NILES, OHIO, ASSIGNOR TO THE COLUMBUS MACHINE COMPANY, OF COLUMBUS, OHIO, A CORPORATION OF OHIO

ANGLE OR CROSS VALVE

Application filed April 7, 1928. Serial No. 268,140.

This invention relates to improvements in angle or cross valves of either the globe or check type and has for its principal objects the provision of a valve assembly of the kind aforesaid wherein the bottom and lateral hub members are associated with bushings and the bottom bushing in turn carries a seat ring upon which the globe or check valve is adapted to seat.

In the accompanying drawings forming a part of this specification.

Figures 1, 2:
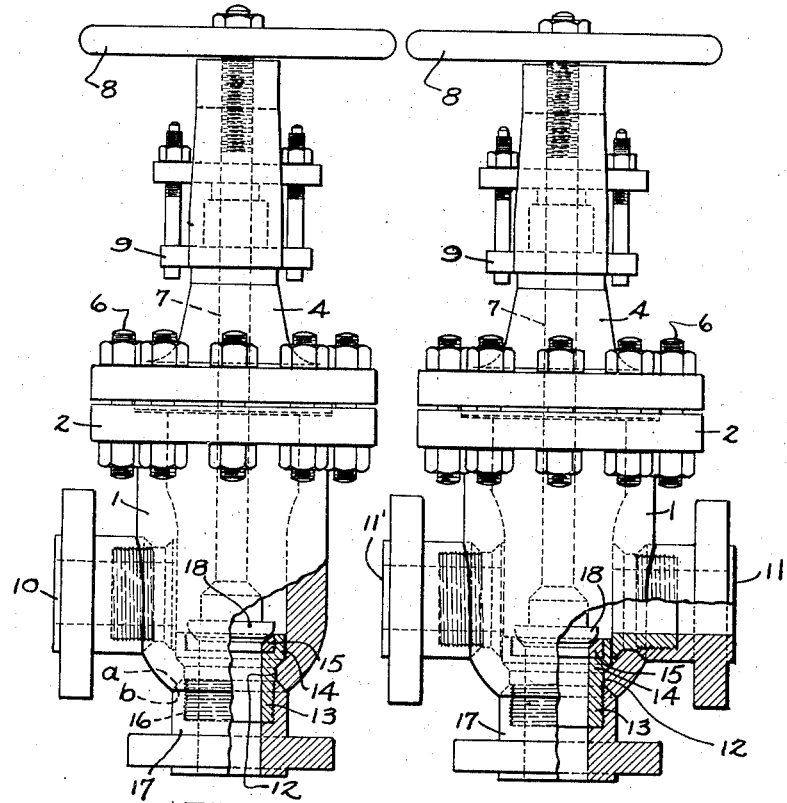
Figures 1 and 2 are each elevations, partly in section, of an angle globe valve and a cross globe valve respectively.
Figures 3, 4:
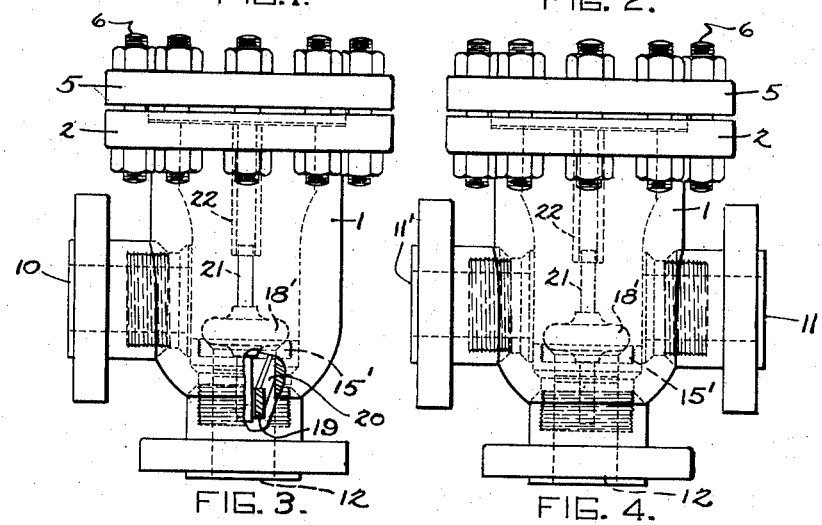
Figs. 3 and 4 are each elevations of an angle check valve and a cross check valve respectively.

Referring to the drawings and the construction shown therein, the reference numeral 1 designates the casing of the body of the angle valves of Figs 1 and 3 and the numeral 1' designates a casing of the slightly modified construction of cross valves shown in Figs. 2 and 4. Each of the said casing has an upper terminal flange 2 to which is secured either a bonnet 4 (Figs 1 and 2) or a top plate 5 (Figs. 3 and 4) by means of bolts 6 in the usual manner. A spindle 7 carrying a hand-wheel 8 is supported in a yoke 9 (Figs. 1 and 2).

The angle valve casings 1 of Figs 1 and 3 each has a single lateral aperture 10 and the cross valve casings 1' are provided with opposing alined lateral apertures 11, 11' respectively, which are indentical with the single aperture of the casing 1'. Each of the valve casings also has a bottom aperture 12 which are identical in the four valves assemblies illustrated herein. A bushing 13 which is of enlarged cross-section at its inner end 14 and is recessed to receive either a seat-ring 15 or 15' is fitted into said aperture 12 with its threaded reduced end 16 projecting through to the outside of the body, the bushing being inserted in said aperture from within the valve chamber. A hub member 17 is applied to the threaded end 16 of the said bushing and when screwed down tight thereon the bevel face $b$ of the hub member is seated on the bevel face $a$ of said casing and when so applied, said hub member serves to hold and maintain a fluid-tight fit between the bushing, the valve body and the hub.

In the construction shown in Figs. 1 and 2 a valve carried by said spindle 7 serves to seal and control the passage of fluid through the valve seat and hub and in the construction shown in Figs. 3 and 4, the passage through the valve seat 15' is controlled by a check valve 18'.

A depending sleeve 19 is connected by arms or braces 20 to the seat-ring 15' and the same serves to guide the lower stem 21 of the check valve 18' and immediately above the said valve and in permanent engagement with the upper stem 21' thereof is a second alined sleeve 22 which is supported by and depended from the top plate 5. Other bushings are similarly fitted in the lateral apertures 10 and 11 of the respective valves shown in the drawings and on the projecting threaded ends thereof hub members are screwed down so as to maintain a fluid-tight joint between each hub, the co-operating bushing and the lateral wall of the valve body adjacent the same. As shown, these latter bushing 23 and the bushing 13 partially overlap each other and are of a size and configuration to admit of the latter bushing being fitted into their receiving apertures 12 subsequent to the insertion of the bushings 23 into the lateral apertures of the valve body.

The joints between the hub members and the valve body may be concealed and virtually obliterated by spot-welding, but such welding is unnecessary for the purpose of insuring that these joints be fluid-tight.

Various modifications of the within described valve assemblies may be made without departing from the spirit of my invention as embraced within the scope of the appended claims.

My improved construction enables me to form the hollow body member by an extrusion operation with the bottom and side walls solid or intact and the side walls below the top flange essentially flat or straight and to then pierce the lateral and bottom walls to establish the fluid ways for the reception of the bushings which are fitted thereinto. In the construction so produced, the walls of said body as formed are of unusually homogeneous texture and free from defects or flaws which enables them to withstand effectively enormous pressure without leakage or distortion. Furthermore, the same body member can be utilized for several different sizes of hub members to suit different sizes of line connections without necessitating a separate die for producing a different size of body for each different size of hub.

Having thus described my invention, what I claim and desire to obtain by United States Letters Patent is:

1. A valve assembly, comprising a body member having lateral and bottom apertures each fitted with a bushing and hub members secured on the outer ends of said bushings, the axis of said bushings in the respective lateral and bottom apertures extending at an angle to each other.

2. A valve assembly, comprising an extruded body member having lateral and bottom openings, bushings fitted to a fluid-tight fit in said openings, each of said bushings having a peripheral flange on its inner end which flange has a bevelled outer face adapted to cooperate and engage with a correspondingly bevelled margin of the opening in which said bushing is fitted and said bushings being adapted to partially overlap each other at their inner ends, and hub members fitted on the respective outer ends of the bushings.

3. A valve assembly, comprising a valve body having fluid ways in its lateral and bottom walls, bushings fitted into said ways, the bushing in the bottom way being provided with a valve seat, and hub members threaded on the outer ends of the respective bushings and having fluid-tight engagement with the walls of the body.

4. A valve assembly, comprising a valve body having an upper terminal flange and side walls below said flange, fluid ways extending through the sides and bottom of the body, bushing members inserted into the respective ways, said bushings each having an inner terminal flange which prevents the passage of said bushing from within the body to the outside thereof and hub members secured to the outer ends of the bushings in fluid-tight engagement with the walls thereof.

Signed at Niles, in the county of Trumbull and State of Ohio, this 8th day of March, 1928.

HARPER R. PORTER.